June 11, 1935.  C. A. FIEBERLING  2,004,502
OVERFLOW DETECTOR
Filed April 22, 1933

INVENTOR.
Charles A. Fieberling
BY Booth & Booth
ATTORNEYS.

Patented June 11, 1935

2,004,502

UNITED STATES PATENT OFFICE 2,004,502

OVERFLOW DETECTOR

Charles A. Fieberling, Oakland, Calif., assignor of one-half to John H. Kimball, Berkeley, Calif.

Application April 22, 1933, Serial No. 667,400

5 Claims. (Cl. 116—118)

The present invention relates to devices for indicating an abnormal condition in a body of liquid, such as a flow induced in a normally static liquid by a leak or overflow from the source of supply.

The widest and most useful application of the invention, illustrated and described herein by way of example, is in connection with the flush tanks of toilets and the like. In such tanks, it is common practice to provide an overflow outlet, above the normal water level, which communicates with the main outlet below the flushing valve, so that when the water level rises, due to failure of the supply valve to close, the excess water runs off into the bowl and thence to the drain, without damage except that involved in the consequent waste of water.

This waste of water from leaking toilets and other flushing apparatus is of serious consequence in regions where water is scarce or expensive, and causes considerable loss, in the aggregate, both to householders and building owners and tenants, and to water supply systems. The rate of flow of the individual leak is usually so small that it is not detected, but it is continuous and therefore results in considerable waste of water before the necessity for repair becomes known.

The principal object of the invention is to provide a simple device which automatically indicates an abnormal condition in a body of liquid, such as a rise in level thereof or a flow therefrom. This object is achieved by introducing into the body of liquid, upon the occurrence of the abnormal condition, a substance having noticeably different physical characteristics from those of the liquid itself, as, for example, a soluble or diffusible coloring matter or dye. When the device is applied to a toilet flush tank, the water therein is distinctively colored when it rises and overflows, this color passing down into and through the bowl, and being easily detectable therein.

A second object of the invention is to provide a device for the above described purpose which can be manufactured and installed at such small expense as to make its use economical. The cost of the water wasted by a small leak, undetected even for a few days, will be greater than the cost of the detector.

It will be apparent that the invention may be embodied, without material change, in devices other than those herein shown and described, and applied to other types of liquid containing and using apparatus. It is to be understood, therefore, that the form, construction and arrangement of the device may be varied, within the limits of the claims hereto appended, without departing from the spirit of the invention as defined therein.

A preferred embodiment of the invention, and a modification thereof, are illustrated in the accompanying drawing, in which.

Figure 1:
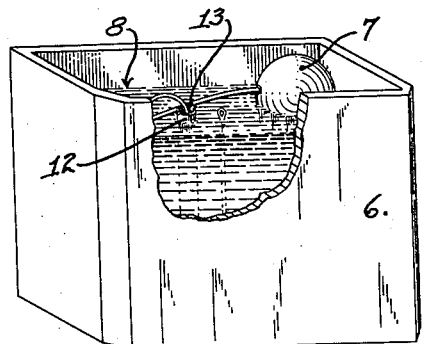
Fig. 1 is a partly broken perspective view of a portion of a toilet and its flush tank, showing the position therein of a preferred form of my detector.

In the drawing, the reference numeral 6 designates the flush tank of a toilet, having the usual water inlet valve controlled by a float 7 to maintain the water at a constant level indicated at 8. The usual outlet or flushing valve, not shown, when opened, permits the water to flow through the outlet connection 10 into the bowl 11 (Fig. 1). An overflow standpipe 12 is provided, having an open upper end above the water level, and communicating at its lower end with the outlet connection 10, so that, if the inlet valve should fail to shut off, the water in the tank will rise to the top of said standpipe 12 as indicated by the broken line 9 in Fig. 2, and then overflow freely through the connection 10 into the bowl. So much is common construction in apparatus of this character.

My invention, in its simplest and preferred form, comprises a thimble 13 fitted to the upper end of the overflow pipe 12 above the normal water level 8, preferably by being slipped into the end thereof, and having upon its exposed or inner surface a coating 14 containing some suitable water-soluble or diffusible coloring matter, preferably a blue dye. Therefore, when the water overflows into the pipe 12, it passes over the coating of dye and is colored thereby, the colored water escaping into the bowl and appearing therein, thus giving a positive and automatic visual indication that an overflow or leak is taking place.

Figure 3:
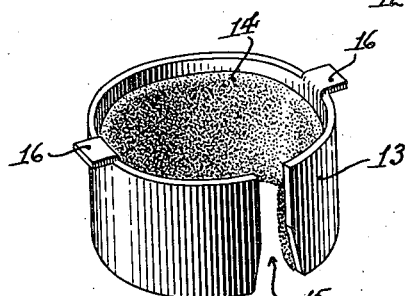
Fig. 3 is a perspective view of the detector thimble.

The thimble 13 is preferably made of spring brass, and is split, as shown at 15 in Fig. 3, to enable it to grip the inside of the pipe 12. Its diameter is such that, when it is compressed within said pipe, the slit 15 is very nearly closed, so that the thimble forms a practically continuous ring inside the pipe. One or more lugs 16 are formed upon the upper end of the thimble, to limit its intrusion into the pipe.

Figure 2:
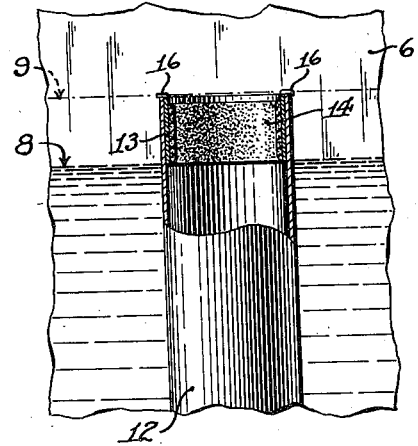
Fig. 2 is a vertical section, on a larger scale, of a portion of the flush tank, showing my detector applied directly to the overflow pipe.

The coating 14 of coloring matter may be applied to the surface of the thimble 13 in any suitable manner. One simple method is to roughen or knurl the surface of the thimble, and apply the dye thereto incorporated in a layer of suitable adhesive binder, as shown in Figs. 2 and 3. It is preferable to terminate the upper edge of the coating 14 somewhat below the upper end of the thimble 13, as shown in Figs. 2 and 3, to provide the most even distribution of water over the surface of said coating.

It will be observed that, in the above described form, my invention is extremely simple, cheap to manufacture, and easy to install and replace when the coloring matter has been washed away by long continued use.

Figure 4:
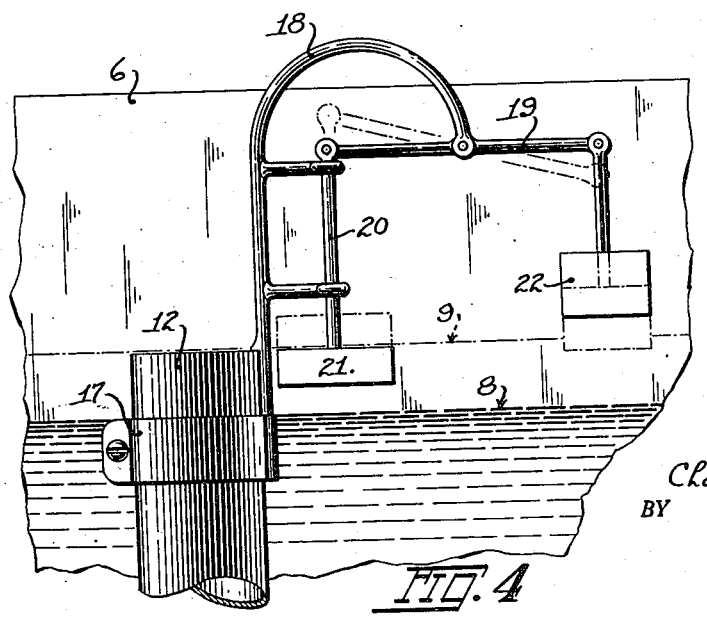
Fig. 4 is a vertical section similar to Fig. 2 showing a modified form of my detector.

Another form of the invention, suitable in cases in which it may be desired or necessary to color the water within the tank instead of only the escaping stream, is illustrated in Fig. 4. In this form of the invention, a suitable support is provided, as for example a clamp 17 encircling the standpipe 12. An arm 18 extends upwardly therefrom, and has pivoted to its bent end a lever 19. One end of said lever is connected by a link 20 with a float 21, and from the other end is suspended a body 22 carrying the coloring matter in some suitable form. When the water level rises to such a height 9 that it overflows the top of the pipe 12, it lifts the float 21, thereby lowering the coloring body 22 into the water, as indicated in broken lines. Thus the entire body of water within the tank is colored, as well as the overflowing or escaping portion thereof.

It will be obvious that the thimble 13 shown in Figs. 2 and 3 may be arranged to fit over the outside of the overflow pipe 12, in which case the lugs 16 would be turned inwardly, and the coating 14 of coloring matter would be upon the outside. In such case, the result would be the same as that achieved by the form of device shown in Fig. 4, viz:—the entire body of liquid would be colored when its level rose to height of the thimble.

I claim:—

1. An apparatus for the described purpose comprising a liquid container having an outlet, a removable member associated with said outlet, and a body of normally dry coloring matter adhering to said member around the rim of said outlet, said coloring matter being diffusible in said liquid, whereby said liquid is colored upon flowing through said outlet.

2. An apparatus for the described purpose comprising a liquid conducting pipe having an open end, and a thimble removably fitted to said open end, said thimble carrying an annular body of coloring matter diffusible in said liquid, whereby said liquid is colored upon flowing through said pipe.

3. An apparatus for the described purpose comprising a liquid container having an outlet, and a body of normally dry material positioned in close proximity to the rim of said outlet without obstructing the free aperture thereof, and normally out of contact with said liquid, said material being diffused in the liquid when said liquid flows over said rim and through said outlet, to impart thereto a distinctive and readily discernible quality.

4. An overflow indicating attachment for a liquid containing tank having an overflow outlet, comprising a thimble formed for removable fitting to said outlet, and a body of diffusible material carried by said thimble in a position to be diffused in the liquid flowing through said outlet without obstruction thereto, said material being of a nature to impart a readily discernible quality to said liquid when diffused therein.

5. An overflow indicating attachment for a liquid containing tank having an overflow outlet, comprising an annular thimble formed for removable fitting to said outlet, one surface of said thimble frictionally contacting the wall of said outlet, and a layer of diffusible material adhering to the exposed surface of said thimble in a position to be diffused in the liquid flowing through said outlet, said material being of a nature to impart a readily discernible quality to said liquid when diffused therein.

CHARLES A. FIEBERLING.